United States Patent [19]

Otten

[11] Patent Number: 4,520,573
[45] Date of Patent: Jun. 4, 1985

[54] GUIDE RAIL FOR A DRAWING MACHINE CARRIAGE

[75] Inventor: Heinrich Otten, Wilhelmshaven, Fed. Rep. of Germany

[73] Assignee: Franz Kuhlmann Prazisionsmechanik und Maschinenbau GmbH & Co. KG, Wilhelmshaven, Fed. Rep. of Germany

[21] Appl. No.: 460,485

[22] Filed: Jan. 24, 1983

[30] Foreign Application Priority Data

Jan. 25, 1982 [DE] Fed. Rep. of Germany ....... 3202191
Sep. 3, 1982 [DE] Fed. Rep. of Germany ....... 3232776

[51] Int. Cl.$^3$ ............................................. B43L 13/02
[52] U.S. Cl. ........................................ 33/438; 33/430
[58] Field of Search .............. 33/438, 430, 403, 147 J, 33/147 T, 143 M, 125 R, 125 C, 1 M; 277/DIG. 6, 237 R, 237 A, 12; 308/3.5

[56] References Cited

U.S. PATENT DOCUMENTS

| 2,785,262 | 3/1957 | Bourns | 308/3.5 |
| 3,446,539 | 5/1969 | Sartorio | 308/3.5 |
| 3,447,244 | 6/1969 | Scholl | 33/125 M |
| 3,673,691 | 7/1972 | Gilbert | 33/438 |
| 4,202,554 | 5/1980 | Snell | 277/53 |

FOREIGN PATENT DOCUMENTS

| 883985 | 7/1953 | Fed. Rep. of Germany ....... 308/3.5 |
| 2551566 | 5/1977 | Fed. Rep. of Germany . |
| 2712421 | 9/1978 | Fed. Rep. of Germany .... 33/125 C |
| 1194779 | 6/1970 | United Kingdom .............. 33/147 J |

Primary Examiner—Harry N. Haroian
Attorney, Agent, or Firm—Pearne, Gordon, Sessions, McCoy, Granger & Tilberry

[57] ABSTRACT

A guide rail for a drawing machine carriage has a single part or multipart track configuration for guiding a carriage with a longitudinally extending slot through which projects the supporting arm of the carriage. In order to achieve simple and reliable dust protection, the slot is provided with a covering element which extends over the slot without impeding the mounting arm. The covering element may be a dustproof sealing lip or a continuous band which is attached to the carriage.

13 Claims, 5 Drawing Figures

GUIDE RAIL FOR A DRAWING MACHINE CARRIAGE

BACKGROUND OF THE INVENTION

1. Field of the Invention

This invention relates to a guide rail for a drawing machine carriage with a one or more part track configuration that has a slot which runs longitudinally and from which the supporting arm of the carriage projects.

2. Description of the Prior Art

On drawing machine carriages, there is a horizontal carriage on horizontal guide rails which are mounted on the top face of the drawing board. A vertical carriage is mounted on the horizontal carriage, and the vertical carriage supports the drawing head and the drawing device and rules, etc. which are attached to it.

As a rule, the guide rails form a hollow track configuration. The known guide rails have a somewhat rectangular cross section and the side which points toward the drawing board is open and has lateral and symmetrically formed bearing surfaces along which the rollers of the carriage travel. The rollers of the carriage are on a support arm or mounting arm which projects from the area of the track configuration of the guide rail and serves for the mounting of either the vertical rail or the drawing head.

Extensive demands are made on the quiet, steady, constant, precise and easy motion of the carriage. The rollers and, if present, additional guide rails of the carriage, as well as the bearing surfaces of the guide rails, are therefore specially designed and exactly and precisely constructed.

One disadvantage of the known guide rails is that, after extensive operation, dust and dirt penetrate into the track configuration through the longitudinally extending opening out from which projects the mounting arm of the carriage.

SUMMARY OF THE INVENTION

An object of the present invention is to provide a guide rail of the type known from the previously discussed art which reliably prevents the contamination of the carriage track configuration and the subsequent impairment of the mechanism of the carriage.

This object is attained in accordance with the present invention by providing a flexible covering element which covers the slot without hindering or impeding the carriage movement.

An advantage of the present invention resides in particular in that a covering element is provided which covers the slot in which the mounting arm of the carriage travels without hindering the movement of the mounting arm and the carriage, and whereby the penetration of dust through the slot into the hollow track configuration of the guide rail is considerably diminished.

It is particularly preferable that the slot be closed with a resilient sealing lip which does not admit dust, and that the sealing lip be attached to the guide rail and pushed to the side by the mounting arm as it travels past and subsequently resiliently returns to the closed position. Further, the danger of injury through touching which is presented by an open guide rail profile is reduced by closing the open track configuration of the guide rail.

With multiportioned guide rail track configurations in which an opening extends over the entire bottom side, it is preferable to use on this bottom side a corresponding cover, which may be, for example, a molded cover which is clipped onto one longitudinal edge and which supports on the other free longitudinal edge a sealing lip for the dust-tight covering of the slot. As an alternative to a clipped-on attachment, the cover can be releasably fastened or glued in some other suitable manner on the guide rail. The sealing lip preferably consists of a continuous brush with bristles arranged laterally to the operational direction of the carriage. Alternatively, two continuous brushes can also be used with the free bristle ends arranged against each other.

Other alternatives include construction of the sealing lip as a felt band, a plastic band, or a rubber belt of sufficient resiliency.

In accordance with other preferred embodiments of the invention, the covering element may consist of a continuous band which covers the slot, which is positioned along the length of the slot, and which is connected to the carriage. The continuous band comes together around the carriage and covers the full length of the slot upon motion of the carriage.

The ends of the continuous band are preferably secured to the opposite faces of the slot of the carriage. The face of the continuous band which operates in the area of the slot is preferably easily moved over the surface of the carriage chamber. The continuous band is preferably the same width as the slot or overlaps the edges of the slot on the inside of the carriage chamber. The slot has a groove for the guidance of the longitudinal edges of the continuous band on each of the opposite edges to produce in this manner a labyrinth seal which is particularly preferable to protect the carriage chamber from contamination.

In accordance with one preferred embodiment of the invention, there are return members, e.g., return rollers or posts, which are located at the ends of the guide rails and around which the continuous band runs, so that one face of the continuous band travels in the area of the slot and the other face travels either in the carriage chamber or in a second chamber which is located behind the carriage chamber and, for example, is connected with a balancing weight for the vertical carriage to avoid the need or an additional continuous band which would otherwise join together the balancing weight and the carriage.

BRIEF DESCRIPTION OF THE DRAWINGS

The embodiments of the invention are described in the following drawings, in which.

DETAILED DESCRIPTION OF THE INVENTION

Figure 1:
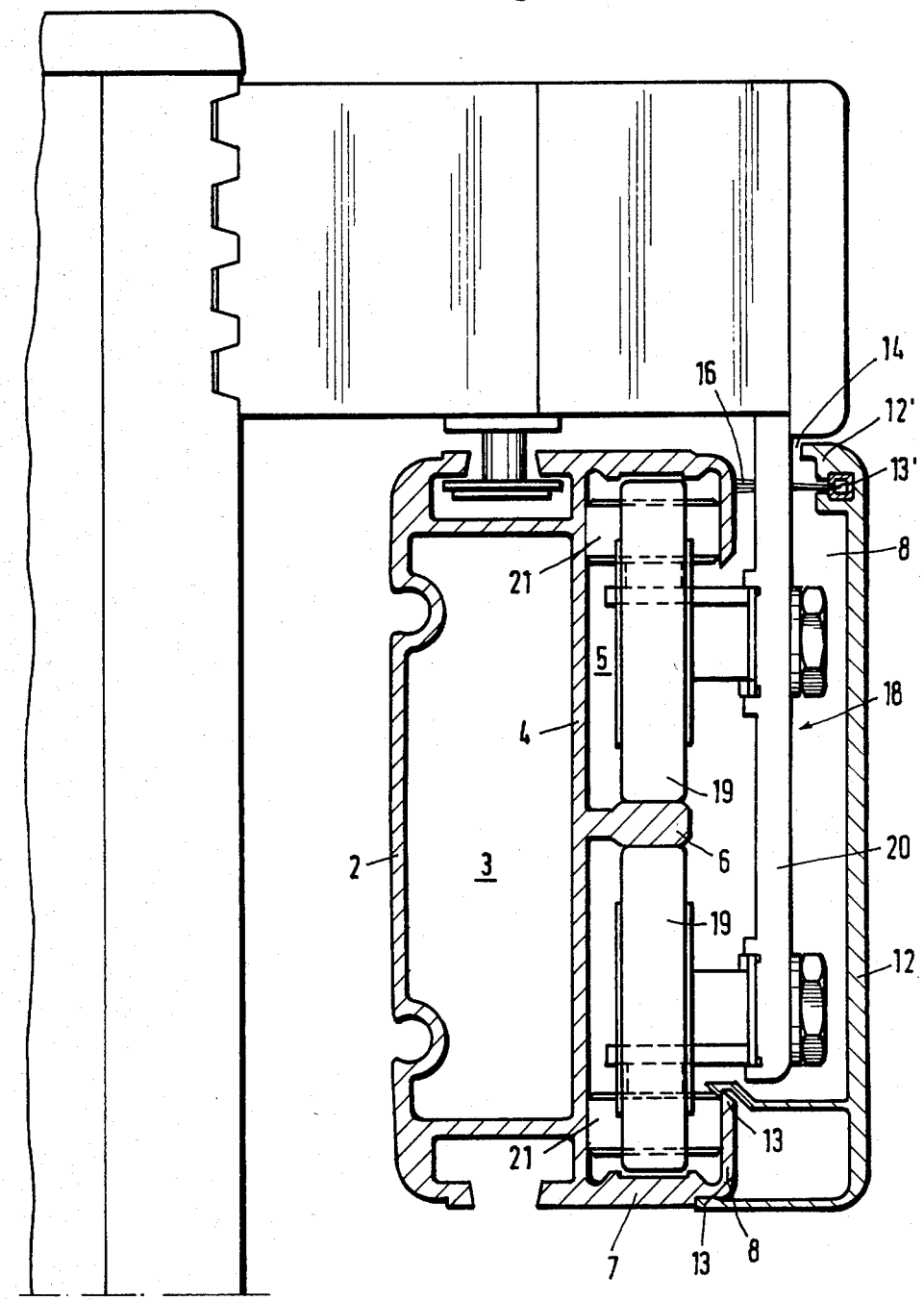
FIG. 1 is a cross section of the first embodiment of the guide rail of the present invention.

FIG. 1 shows the configuration of a guide rail 2 which may be used as a horizontal or vertical guide rail. The guide rail 2 includes a housing forming a hollow chamber 3 for the support of the track configuration. On the opposite side of an inner wall 4 from the hollow chamber 3 is the track configuration 5 of the guide rail. The track configuration 5 has a symmetrically shaped intermediate central projection 6 which has double-sided bearing surfaces for working rollers 19 of a carriage 18. Extending approximately as extensions of the sidewalls of the housing of the guide rail 2 are side projections 7 which are perpendicular to the working rollers 19. The outer ends of the projections 7 are curved to extend parallel to the inner wall 4 and serve as bearing surfaces 8 for guide rollers 21. The working rollers 19 are rotatably mounted on a supporting arm 20 which extends parallel to the inner wall 4 spaced from the track configuration 5 and serves as a support for either the vertical guide rail or a drawing head.

In order to close the open face of the track configuration, a cover 12 is provided having an attachment portion 13 which, in this embodiment, clips onto the guiding surface 8 of the guide rails 2 which is not covered by the supporting arm 20. The cover 12 has a covering element, namely, a flexible sealing lip 16, which together with the guiding surface 8 of the guide rail 2 covers an extensive slot 14. The sealing lip 16 is constructed as a continuous brush in which one side of the continuous brush is inserted in an attachment groove 13' in the cover 12. The sealing lip 16 seals off the slot 14 from dust and dirt and can be pushed to the side at times for only a short duration so that the sealing lip closes before and after the passing of the mounting arm 20.

Figure 2:
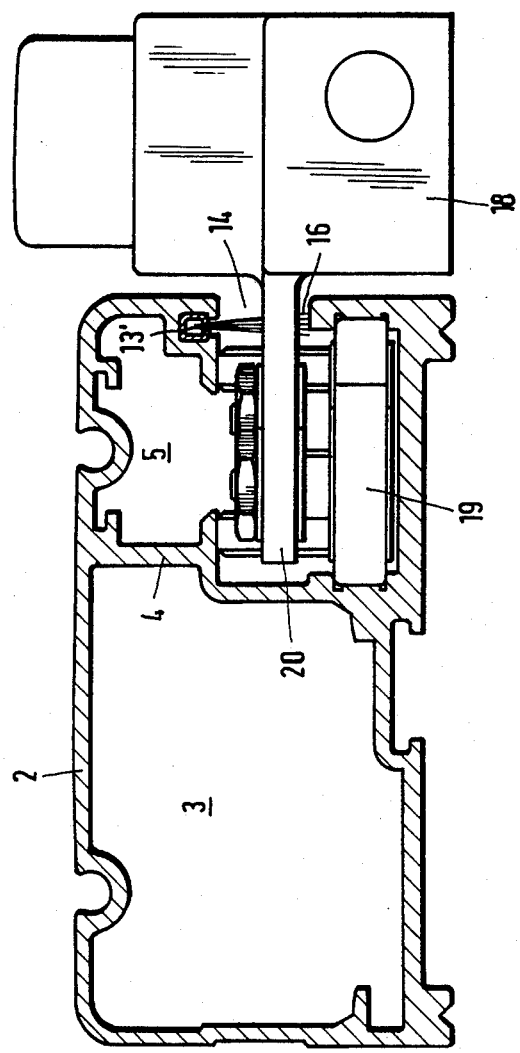
FIG. 2 is a cross section of the second embodiment of the guide rail of the present invention.

In FIG. 2, a cross section of a second guide rail 2 is represented which is particularly suited, for example, as a vertical guide rail. The guide rail 2 has a housing forming a first hollow chamber 3 enclosed by an inner wall 4 which is perpendicular to the top and bottom outer walls. The track configuration 5 is located near the first hollow chamber 3. The track configuration is essentially constructed in a second hollow chamber 5 which has a lateral slot 14 through which the supporting arm 20 of the carriage 18 extends from the track configuration.

A groove 13' is provided on one of the edges of the slot 14. The covering element which is comprised of only the sealing lip 16 is mounted in the groove 13'.

The sealing lip can be comprised of a continuous brush or a suitably elastic plastic, felt, or rubber belt which lies against the opposite edge of the slotted track 14 because of its elasticity before and after the presence of the supporting arm 20, and thereby provides reliable and secure protection from dust.

Figure 3:
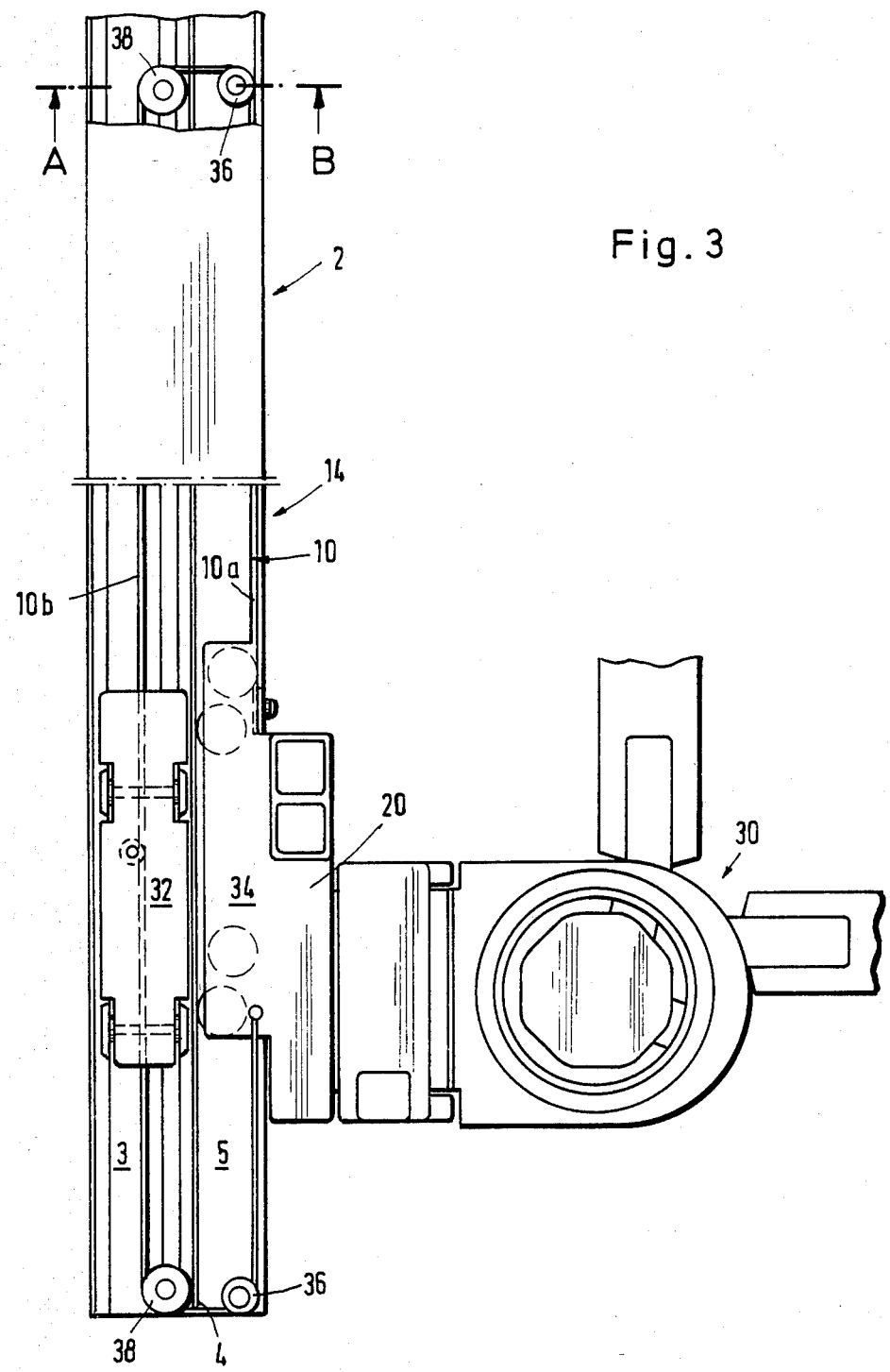
FIG. 3 is plan view of a guide rail with a carriage on which the drawing head of a drawing machine is mounted and which shows a third embodiment of the invention.
Figure 4:
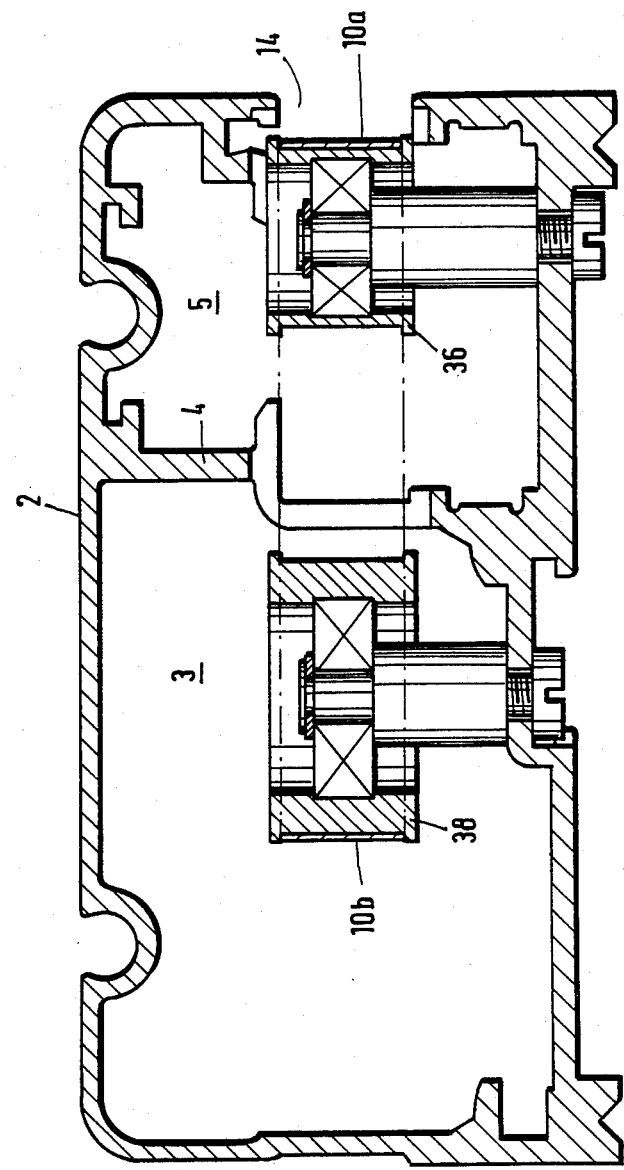
FIG. 4 is a cross section of the guide rail of FIG. 3 taken along line A—B.

FIGS. 3 and 4 show another guide rail 2 with a carriage 34 which travels in this guide rail 2. The carriage 34 travels on a track in a second hollow chamber 5 of the housing at the guide rail 2 by means of rollers, and has a supporting arm 20 which supports any of various drawing devices, e.g., a drawing head 30. The second hollow chamber 5 of the guide rail 2 has a slot 14 which extends longitudinally along the guide rail and through which projects the supporting arm 20 of the carriage 34. A first hollow chamber 3 is located adjacent to the second hollow chamber 5 in the guide rail 2, as is illustrated particularly in FIG. 4.

The two chambers 3 and 5 are separated from each other by an inner wall 4. The depicted guide rail 2 is used as a vertical guide rail for a drawing machine carriage. The first hollow chamber 3 serves to support and guide a counterweight 32 which balances the weight of the carriage 34 and the drawing device 30 which is attached to the carriage 34.

A continuous band 10 is positioned along the slot 14 and is attached to the carriage 34 in the area of the slot 14. The continuous band 10 is about the same width as the slot 14 or is slightly wider in order to completely cover the slot 14. The surface 10a of the continuous band which extends across the slot 14 is positioned against the outer edges of the slot area and displaced slightly toward the inside of the hollow chamber 5. Guide rollers or return rollers 36,38 over which the continuous band travels are preferably provided at each end in the chamber 5 and, if necessary, also in chamber 3, so that the continuous band 10 covers the slot 14 along its entire length and protects the chamber 5 from contamination.

In accordance with the embodiment of FIGS. 3 and 4, a pair of return rollers 36, one at each end of the slot 14 on the end of the guide rail 2, is preferred. A second pair of return rollers 38 is positioned at the ends in the first chamber 3 so that the return face 10b of the continuous band travels in about the middle of the first chamber 3. The return face 10b runs approximately through the middle of the counterweight 32 and is attached to the counterweight.

The two ends of the continuous band 10 are glued and secured on the carriage 34, e.g., by screws or rivets, so that the continuous band 10 is flexible.

The continuous band 10 preferably is fabricated from a substantially inelastic material which is readily flexible. A continuous band of polyester material has proven to be suitable.

Figure 5:
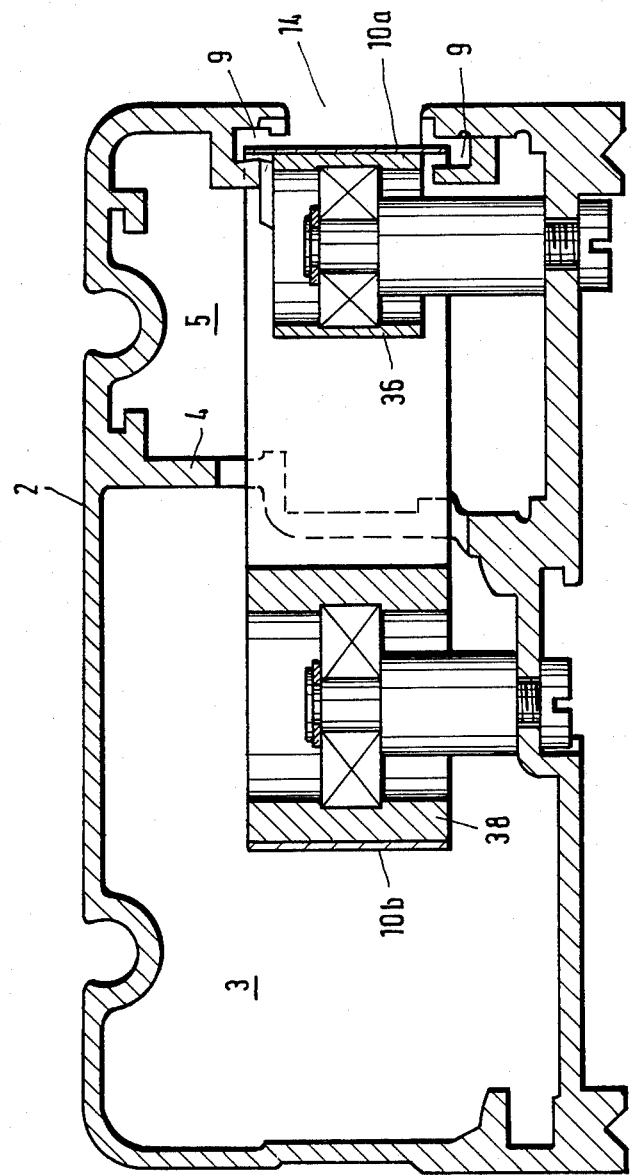
FIG. 5 is a cross section which is similar to FIG. 4 and which shows an alternative guide mechanism for the continuous band along the slot.

FIG. 5 shows another cross section through the guide rail corresponding to FIG. 4 along line A–B of FIG. 3, but with a different guide mechanism for the continuous band 10 along the slot 14. On each wall edge of the guide rail 2 which are opposite each other and which form the slot 14 is a groove 9. The two grooves 9 are positioned across from each other and guide the longitudinal edges of the continuous band 10 which correspondingly extends between them and thereby overlaps the visible width of the slot 14 and covers it as a labyrinth seal.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A guide rail for a drawing machine carriage comprising:
    a housing forming a track configuration for the guidance of the carriage;
    said housing including first and second spaced apart longitudinally extending surfaces which form a first slot adjacent to said track configuration;

carriage means traveling on said track configuration and supported thereby, said carriage means extending through said slot;

a covering element comprising a continuous band which covers the first slot along the length of the slot and which is connected to the carriage means;

said housing forming a first hollow chamber for the guidance of a counterweight and a second hollow chamber for the guidance of said carriage means, and a second longitudinal slot between said first and second hollow chambers, wherein as the carriage means moves one face of the continuous band travels adjacent with the first longitudinal slot and the other face of the continuous band travels through the first hollow chamber and is attached to the counterweight.

2. A guide rail as set forth in claim 1, wherein the slot has a groove on each of its opposing edges within which an edge of the continuous band is located for the guidance of the continuous band.

3. A guide rail as set forth in claim 2, wherein the continuous band is substantially incapable of stretching and distortion.

4. A guide rail as set forth in claim 1, comprising in addition members which are located at the ends of the guide rail and around which the continuous band travels as the carriage means moves.

5. A guide rail as set forth in claim 4, wherein said members are rollers.

6. A guide rail as set forth in claim 5, wherein the slot has a groove on each of its opposing edges within which an edge of the continuous band is located for the guidance of the continuous band.

7. A guide rail as set forth in claim 6, wherein the continuous band is substantially incapable of stretching and distortion.

8. A guide rail as set forth in claim 7, wherein the continuous band is of polyester material.

9. A guide rail for a drawing machine carriage, comprising:

a housing forming a track configuration for the guidance of the carriage, the housing including a first member forming said track configuration and a second cover member which cooperates with said first member to enclose said track configuration, said second cover member clipping onto said first member to form said track configuration, said first member and said second cover member including first and second spaced-apart longitudinally extending surfaces which form a slot adjacent to said track configuration, said first member including one of said spaced-apart surfaces and said second cover member including the other of said spaced-apart surfaces;

carriage means traveling on said track configuration and supported thereby, said carriage means extending through said slot; and a single flexible covering element and cooperating with said second surface to cover said slot, said covering element being flexibly biased about said carriage means extending between said spaced-apart surfaces to form a labyrinth seal of said slot.

10. A guide rail as set forth in claim 9, wherein said covering element comprises a resilient sealing lip which covers the slot.

11. A guide rail as set forth in claim 9, wherein said covering element comprises a continuous brush.

12. A guide rail as set forth in claim 9, wherein said brush is held in a groove in the housing, said groove extending adjacent to the slot.

13. A guide rail as set forth in claim 9, wherein said continuous brush has bristles arranged laterally to the operational direction of the carriage.

* * * * *